United States Patent [19]

Tanihara et al.

[11] Patent Number: 5,137,783
[45] Date of Patent: Aug. 11, 1992

[54] ACICULAR MAGNETIC METAL PARTICLES CONTAINING IRON AS MAIN INGREDIENT AND PROCESS FOR PRODUCING THE SAME

[75] Inventors: Mamoru Tanihara, Hiroshima; Yasutaka Ota, Hatsukaichi; Hiroshi Fukui; Takashi Ogawa, both of Yokohama; Tsuneo Suhara, Zama, all of Japan

[73] Assignees: Toda Kogyo Corporation, Hiroshima; Shiseido Company, Limited, Tokyo, both of Japan

[21] Appl. No.: 502,553

[22] Filed: Apr. 2, 1990

[30] Foreign Application Priority Data

Apr. 7, 1989 [JP] Japan ................................. 1-88650
Dec. 4, 1989 [JP] Japan ................................. 1-315605

[51] Int. Cl.$^5$ .............................................. B32B 15/08
[52] U.S. Cl. ........................................ 428/407; 428/403; 75/348; 252/62.54; 252/62.56
[58] Field of Search ............... 428/407, 403; 75/348; 252/62.54, 62.56

[56] References Cited

U.S. PATENT DOCUMENTS

| | | | |
|---|---|---|---|
| 4,005,242 | 1/1977 | Kopke et al. | 428/425 |
| 4,133,677 | 1/1979 | Matsui et al. | 75/0.5 |
| 4,406,694 | 9/1983 | Mishima et al. | 75/0.5 |
| 4,437,881 | 3/1984 | Mishima et al. | 75/0.5 |
| 4,514,216 | 4/1985 | Mishima et al. | 75/0.5 |
| 4,666,929 | 5/1987 | Sato et al. | 514/357 |
| 4,773,931 | 9/1988 | Mishima et al. | 75/251 |
| 4,801,445 | 1/1989 | Fukui et al. | 424/69 |
| 4,818,614 | 4/1989 | Fukui et al. | 428/403 |

FOREIGN PATENT DOCUMENTS 0212870 3/1987 European Pat. Off.
0224978 6/1987 European Pat. Off.

Primary Examiner—Paul J. Thibodeau
Assistant Examiner—Mark A. Forman
Attorney, Agent, or Firm—Nixon & Vanderhye

[57] ABSTRACT

Disclosed herein are acicular magnetic metal particles containing iron as the main ingredient the surfaces of which are coated with a polymer formed from at least one of silicone compounds represented by the following formula (I):

$$(R^1HSiO)_a(R^2R^3SiO)_b(R^4R^5R^6SiO_{1/2})_c \qquad (I)$$

wherein $R^1$, $R^2$, $R^3$, $R^4$, $R^5$ and $R^6$ respectively represent a hydrogen atom or hydrocarbon group having 1 to 10 carbon atoms which hydrocarbon group may be substituted by at least one halogen atom, a and b are respectively 0 or integers of not less than 1, and c is 0 or 2, provided that when c is 0, the sum of a and b is an integer of not less than 3 and which have a coercive force of not less than 1400 Oe, a saturation magnetization of not less than 100 emu/g, a major axial diameter of not more than 0.25 μm and an S.F.D. of not more than 0.38, and a process for producing the acicular magnetic metal particles containing iron as the main ingredient.

9 Claims, No Drawings

ACICULAR MAGNETIC METAL PARTICLES CONTAINING IRON AS MAIN INGREDIENT AND PROCESS FOR PRODUCING THE SAME

BACKGROUND OF THE INVENTION

The present invention relates to acicular magnetic metal particles containing iron as the main ingredient which are used for high-density recording and which are excellent in switching field distribution (hereinunder referred to as "S.F.D.") and dispersibility, and are capable of producing a high output, and a process for producing such particles.

The present invention also relates to acicular magnetic metal particles containing iron as the main ingredient which have a high coercive force, a high saturation magnetization, a fine particle size and excellent S.F.D., and a process for producing such particles.

With the recent development of smaller-sized and lighter-weight magnetic recording apparatuses, the necessity for recording media having a higher performance such as a magnetic tape and a magnetic disk has been increasing more and more. In other words, magnetic recording media is required to have a higher recording density, higher output characteristic, in particular, an improved frequency characteristic and a lowered noise level. In order to satisfy the above-described demands on magnetic recording media, magnetic particles used in the production of the magnetic recording media must have a high coercive force, a high saturation magnetization, a fine particle size and an excellent S.F.D.

To meet such demands, development of magnetic particles which are suitable for high-output and high-density recording, namely, magnetic particles having a high coercive force and a high saturation magnetization, has been pursued. As magnetic particles having the above-described properties, acicular magnetic metal particles containing iron as the main ingredient obtained by heat-treating as a starting material acicular ferric oxide hydroxide particles which are obtained by oxidizing a neutralized precipitate of a ferrous salt and an aqueous alkaline solution such as alkali hydroxide and alkali carbonate, or acicular hematite particles which are obtained by heat-treating the thus-obtained acicular ferric oxide hydroxide particles in a reducing gas so as to produce acicular magnetic metal particles containing iron as the main ingredient; and forming an oxide layer on the surfaces of the particles, are known and put to practical use.

The coercive force of acicular magnetic metal particles is dependent on the shapes of the particles, in particular, on an aspect ratio (major axial diameter: minor axial diameter) and has a tendency of increasing with the increase in the aspect ratio. The saturation magnetization has a tendency of increasing with the acceleration of reduction, for example, by raising the reducing temperature. The coercive force and the saturation magnetization have reverse correlation. That is, while the saturation magnetization is enhanced with the progress of reduction, since the heat-treatment is carried out under the severe conditions, the particles grow and sintering is caused on particles and between particles, and as a result the shapes of the particles are lost, thereby reducing the coercive force. Thus, acicular magnetic metal particles having both high coercive force and large saturation magnetization are strongly demanded. Acicular magnetic iron particles are also required to have excellent dispersibility, and it is therefore necessary that sintering of particles and between particles are prevented during the heat-treating step and the oxide layer producing step after heat-treatment so as to maintain the shapes of the particles, and that the particles are independently distributed.

Although acicular magnetic metal particles have a high coercive force and a large saturation magnetization, they are very unstable. More specifically, since the acicular magnetic metal particles used for magnetic recording media are very fine particles having a particle size of not more than 1 $\mu$m, the surface activity of the particles is so large and when such acicular magnetic metal particles are taken out into air after reduction, they rapidly react with the oxygen in air, thereby igniting. In addition, by such oxidation reaction these particles are converted into oxides, thereby greatly reducing the magnetic characteristics, in particular, the saturation magnetization, so that it is impossible to obtain acicular magnetic metal particles having a large saturation magnetization aimed at.

It is widely known that the noise level of magnetic recording media has a close relation with the particle size of the acicular magnetic metal particles used in the production of the magnetic recording media and the crystallite size, and that the noise level has a tendency of lowering in proportion to the reduction in the particle size and the crystallite size.

Furthermore, in order to increase the output of magnetic recording media, in addition to the improvement of the magnetic characteristics, the acicular magnetic metal particles are required to have excellent S.F.D.

As is seen from the descriptions in Japanese Patent Application Laid-Open (KOKAI) No. 63-26821 (1988), if the relationship between the S.F.D. of magnetic recording media, and the recording and reproducing output is represented as a graph, as the S.F.D. becomes smaller, the recording and reproducing output linearly increases, which this fact means that the recording and reproducing output is enhanced by using magnetic particles having a small S.F.D. In order to obtain a larger output, an S.F.D. of not more than 0.6 is required.

It is the general tendency that the smaller the particle size of the acicular magnetic metal particles containing iron as the main ingredient is, the coercive force generally tends to increase and the noise level lowers. Bu since the surface activity of the particles becomes greatly large, when forming an oxide layer by an ordinary method, the reaction with the oxygen in air is rapidly carried out, and as a result the ratio of the oxide layer to the particles relatively increases and, in addition, the oxide layer becomes coarse and non-uniform. Accordingly, the magnetic characteristics, in particular, the saturation magnetization reduced to a great extent, and the coercive force distributes, thereby lowering the S.F.D. This phenomenon is apt to be caused as the particle size becomes smaller.

Various methods of improving the properties of acicular magnetic metal particles have conventionally been adopted. A method of preventing the sintering of the particles and between the particles in the heat-treatment step, comprising coating the surfaces of the particles in advance with various organic compounds or inorganic compounds having a sintering preventive activity is known. In the methods disclosed for example, in Japanese Patent Publication Nos. 60.17802 (1985), 53-11512 (1978), Japanese Patent Application Laid-Open (KOKAI) No. 51-106669 (1976), 52-9900 (1977), 52-30758 (1977), 55-85605 (1980), 55-85606 (1980), 57-60001 (1982), 58-113305 (1983), 59-207843 (1984) and 59-213626 (1984), a silicon compound is used as the compound having a sintering preventive activity.

Also, a method of improving the oxidation stability of the acicular magnetic metal particles containing iron as the main ingredient by contacting the acicular magnetic metal particles containing iron as the main ingredient after reduction with a gaseous organic silicon compound is reported in Japanese Patent Application Laid-Open (KOKAI) No. 60-154502 (1985). In this method, however, since a silane compound having a strong hydrolytic activity is used and the hydrolysis reaction is accelerated in the positive presence of water so as to form an $SiO_2$ coating layer, the hydrolysis reaction rapidly progresses and it is impossible to obtain acicular magnetic metal particles containing iron as the main ingredient which adequately satisfies the above-described properties.

As a result of the present inventors' studies for achieving the object of providing acicular magnetic metal particles containing iron as the main ingredient which have excellent S.F.D. and dispersibility, it has been found that the acicular magnetic metal particles containing iron as the main ingredient obtained by (1) heat-treating in a reducing gas acicular ferric oxide hydroxide particles or acicular hematite particles obtained by heat-treating the acicular ferric oxide hydroxide particles, thereby obtaining acicular magnetic metal particles containing iron as the main ingredient; (2) contacting the acicular magnetic metal particles containing iron as the main ingredient with at least one of the silicone compounds represented by the following formula (I) in a gas phase:

(wherein $R^1$, $R^2$, $R^3$, $R^4$, $R^5$ and $R^6$ respectively represent a hydrogen atom or hydrocarbon group having 1 to 10 carbon atoms which may be substituted by at least one halogen atom, a and b are respectively 0 or integers of not less than 1, and c is 0 or 2, provided that when c is 0, the sum of a and b is an integer of not less than 3) so as to coat the surfaces of the particles in advance with a polymer formed from the silicone compounds represented by the formula (I) and treating the acicular magnetic metal particles containing iron as the main ingredient in an oxygen-containing inert atmosphere, thereby forming an oxide layer on the surfaces of the particles, or (2') coating the surfaces of the particles of the acicular magnetic metal particles containing iron as the main ingredient with a polymer formed from the silicone compounds represented by the formula (I) while forming an oxide layer on the surfaces thereof, can achieve the above-described object.

The present invention has been attained on the basis of this finding.

SUMMARY OF THE INVENTION

In a first aspect of the present invention, there is provided acicular magnetic metal particles containing iron as the main ingredient the surfaces of which are coated with a polymer formed from at least one of silicone compounds represented by the following formula (I):

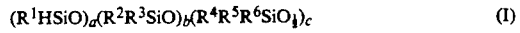

(wherein $R^1$, $R^2$, $R^3$, $R^4$, $R^5$ and $R^6$ respectively represent a hydrogen atom or hydrocarbon group having 1 to 10 carbon atoms which may be substituted by at least one halogen atom, a and b are respectively 0 or integers of not less than 1, and c is 0 or 2, provided that when c is 0, the sum of a and b is an integer of not less than 3) and which have a coercive force of not less than 1400 Oe, a saturation magnetization of not less than 100 emu/g, a major axial diameter of not more than 0.25 μm and an S.F.D. of not more than 0.38.

In a second aspect of the present invention, there is provided acicular magnetic metal particles containing iron as the main ingredient the surfaces of which are coated with a polymer formed from at least one of silicone compounds represented by the following formula (I):

(wherein $R^1$, $R^2$, $R^3$, $R^4$, $R^5$ and $R^6$ respectively represent a hydrogen atom or hydrocarbon group having 1 to 10 carbon atoms which may be substituted by at least one halogen atom, a and b are respectively 0 or integers of not less than 1, and c is 0 or 2, provided that when c is 0, the sum of a and b is an integer of not less than 3) and which have a coercive force of not less than 1500 Oe, a saturation magnetization of not less than 155 emu/g, a major axial diameter of not more than 0.2 μm and an S.F.D. of not more than 0.35.

In a third aspect of the present invention, there is provided a process for producing acicular magnetic metal particles containing iron as the main ingredient the surfaces of which are coated with a polymer formed from at least one of silicone compounds represented by the following formula (I):

(wherein $R^1$, $R^2$, $R^3$, $R^4$, $R^5$ and $R^6$ respectively represent a hydrogen atom or hydrocarbon group having 1 to 10 carbon atoms which may be substituted by at least one halogen atom, a and b are respectively 0 or integers of not less than 1, and c is 0 or 2, provided that when c is 0, the sum of a and b is an integer of not less than 3) and which have a coercive force of not less than 1400 Oe, a saturation magnetization of not less than 100 emu/g, a major axial diameter of not more than 0.25 μm and an S.F.D. of not more than 0.38, the process comprising the steps of: (1) heat-treating in a reducing gas acicular ferric oxide hydroxide particles or acicular hematite particles obtained by heat-treating the acicular ferric oxide hydroxide particles, thereby obtaining acicular magnetic metal particles containing iron as the main ingredient; (2) contacting the acicular magnetic metal particles containing iron as the main ingredient with at least one of the silicone compounds represented by the formula (I) in a gas phase so as to coat the surfaces of the particles in advance with a polymer formed from the silicone compounds represented by the formula (I) and oxidizing the resultant acicular magnetic metal particles containing iron as the main ingredient in an oxygen-containing inert atmosphere, thereby forming an oxide layer on the surfaces of the particles, or (2') contacting the acicular magnetic metal particles containing iron as the main ingredient with at least one of the silicone compounds represented by the formula (I) in a gas phase so as to coat the surfaces of the particles with a polymer formed from the silicone compounds represented by the formula (I), while forming an oxide layer on the surfaces thereof.

In a fourth aspect of the present invention, there is provided a process for producing acicular magnetic metal particles containing iron as the main ingredient the surfaces of which are coated with a polymer formed from at least one of silicone compounds represented by the following formula (I):

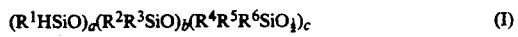

(wherein $R^1$, $R^2$, $R^3$, $R^4$, $R^5$ and $R^6$ respectively represent a hydrogen atom or hydrocarbon group having 1 to 10 carbon atoms which may be substituted by at least one halogen atom, a and b are respectively 0 or integers of not less than 1, and c is 0 or 2, provided that when c is 0, the sum of a and b is an integer of not less than 3) and which have a coercive force of not less than 1500 Oe, a saturation magnetization of not less than 155 emu/g, a major axial diameter of not more than 0.2 μm and an S.F.D. of not more than 0.35, the process comprising the steps of: (1) heat-treating in a reducing gas acicular ferric oxide hydroxide particles or acicular hematite particles obtained by heat-treating the acicular ferric oxide hydroxide particles, thereby obtaining acicular magnetic metal particles containing iron as the main ingredient; (2) contacting the acicular magnetic metal particles containing iron as the main ingredient with at least one of the silicone compounds represented by the formula (I) in a gas phase so as to coat the surfaces of the particles in advance with a polymer formed from the silicone compounds represented by the formula (I), heat-treating the coated particles at a temperature of 100° to 250° C. and oxidizing the resultant acicular magnetic metal particles containing iron as the main ingredient in an oxygen-containing inert atmosphere, thereby forming an oxide layer on the surfaces of the particles.

DETAILED DESCRIPTION OF THE INVENTION

Acicular magnetic metal particles containing iron as the main ingredient according to the present invention are particles the surfaces of which are coated with a polymer formed from at least one of silicone compounds represented by the formula (I), and which have a coercive force of not less than 1400 Oe, a saturation magnetization of not less than 100 emu/g, a major axial diameter of not more than 0.25 μm, an aspect ratio (major axial diameter/minor axial diameter) is not less than 3, preferably not less than 4, more preferably not less than 5, an S.F.D. of not more than 0.38, and a crystallite size of not more than 185 Å.

The acicular magnetic metal particles containing iron as the main ingredient according to the present invention are produced by (1) heat-treating in a reducing gas acicular ferric oxide hydroxide particles or acicular hematite particles obtained by heat-treating the acicular ferric hydroxide oxide particles, thereby obtaining acicular magnetic metal particles containing iron as the main ingredient: and (2) contacting the acicular magnetic metal particles containing iron as the main ingredient with at least one of the silicone compounds represented by the formula (I) (hereinunder referred to as "specified silicone compound monomer") in a gas phase so as to coat the surfaces of the particles in advance with a polymer formed from the specified silicone compound monomer and oxidizing the acicular magnetic metal particles containing iron as the main ingredient in an oxygen-containing inert atmosphere, thereby forming an oxide layer on the surface of the particles, or (2') coating the surfaces of the particles of the acicular magnetic metal particles containing iron as the main ingredient with a polymer formed from the specified silicone compound monomer, while forming an oxide film on the surfaces thereof. The process comprising the steps (1) and (2) is preferable. The thus-obtained acicular magnetic metal particles containing iron as the main ingredient have preferably, an oxidation stability of not more than 10%.

An oxide layer in the present invention is formed by after substituting the atmosphere after the reduction by an inert gas, gradually oxidizing the particles in the inert gas while gradually increasing the oxygen content in the inert gas so that the particles are finally oxidized in air. If necessary, another known oxidization method may be combined therewith. For example, the particles may also be dipped into an organic solvent such as toluene.

It is preferably to heat-treat the particles with the surfaces thereof coated with a polymer formed from the specified silicone compound monomer, preferably to heat-treat those particles at a temperature of 100° to 250° C., and to aerate the particles with the air content, the amount of air for aeration and the aerating time so controlled as to be as mild conditions as possible, preferably that the amount of air for aeration based on an amount of the metal particles is not more than 2.0 l/min·kg, more preferably not more than 1.8 /min·kg, and more preferably that the amount of air for aeration is not more than 2.0 l/min·kg and the aeration time is at least 15 minutes in the initial oxidation treatment, even more preferably that the amount of air for aeration is not more than 1.8 l/min·kg and the aeration time is not smaller than 15 minutes in the initial oxidation treatment, thereby obtaining acicular magnetic metal particles containing iron as the main ingredient having high coercive force and saturation magnetization and an excellent S.F.D.

The thus-obtained acicular magnetic metal particles containing iron as the main ingredient have a coercive force of not less than 1500 Oe, a saturation magnetization of not less than 155 emu/g, preferably not less than 156 enu/g, a major axial diameter of not more than 0.2 μm, preferably 0.08 to 0.19 μm, an aspect ratio (major axial diameter/minor axial diameter) is not less than 3, preferably not less than 4, more preferably not less than 5 and an S.F.D. of not more than 0.35, preferably not more than 0.34.

As the starting material particles in the present invention, acicular ferric oxide hydroxide particles having a major axial diameter of 0.1 to 0.5 μm, preferably 0.1 to 0.3 μm, and an aspect ratio (major axial diameter/minor axial diameter) of not less than 3/1, preferably 4/1, more preferably 5/1 are used. The acicular particle here means a particle having an aspect ratio (major axial diameter/minor axial diameter) of not less than 3/1 and includes a spindle-shaped particle having such aspect ratio, a particle having a shape of a grain of rice and an elliptical particle, and such aspect ratio in addition to an acicular particle.

As the starting material particles in the present invention, acicular hematite particles obtained by heat-treating acicular ferric oxide hydroxide particles may also be used, if necessary. The heat-treatment temperature is preferably 250° to 850° C., and it is more preferable for the maintenance of the shapes of the starting material particles that the acicular ferric oxide hydroxide particles are heat-treated at a temperature of 350° to 700° C. so as to produce highly-densed acicular hematite particles.

The starting material particles in the present invention may contain elements other than Fe which are ordinary used for improving various properties of acicular magnetic metal particles containing iron as the main ingredient, such as Al, Ni, Co, B, Zn, Si and P.

In the present invention, acicular ferric oxide hydroxide particles or acicular hematite particles are heat-treated in a reducing gas. The reducing temperature is preferably 300° to 500° C. If the reducing temperature is lower than 300° C., the progress of the reduction reaction is slow and the reaction takes a long time. On the other hand, if the reducing temperature is higher than 500° C., the reduction reaction so rapidly progresses as to tend to cause sintering of the particles and between the particles.

The acicular magnetic metal particles containing iron as the main ingredient immediately after reduction are contacted with a specified silicone compound monomer i.e. silicone compounds represented by the following formula (I) in a gas phase so as to coat the surfaces of the particles with a polymer formed from the specified silicone compound monomer.

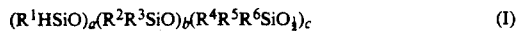

$$(R^1HSiO)_a(R^2R^3SiO)_b(R^4R^5R^6SiO_{\frac{1}{2}})_c \qquad (I)$$

(wherein $R^1$, $R^2$, $R^3$, $R^4$, $R_5$ and $R^6$ respectively represent a hydrogen atom or hydrocarbon group having 1 to 10 carbon atoms, preferably 1–6 carbon atoms which may be substituted by at least one halogen atom, a and b are respectively 0 or integers of not less than 1, and c is 0 or 2, provided that when c is 0, the sum of a and b is an integer of not less than 3, preferably 3–7 )

The typical examples of the specified silicone compound monomer are exemplified by the following formulas (II) and (III). The formula (II) corresponds to the case in which c=0 in the formula (I) and represents a cyclic silicone compound:

$$(R^1HSiO)_a(R^2R^3SiO)_b \qquad (II)$$

(wherein $R^1$, $R^2$, $R^3$, a and b are respectively the same as defined above, and preferably $R^1$, $R^2$, $R^3$, are respectively hydrocarbon group having 1 to 10 carbon atoms, more preferably 1–6 carbon atoms which may be substituted by at least one halogen atom and the sum of a and b is an integer of not less than 3, more preferably 3–7). The typical examples of the cyclic silicone compound are represented by the following formulas (A) and (B):

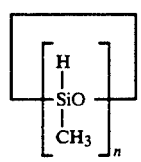

(A)

(wherein n represents an integer of not less than 3, preferably 3–7),

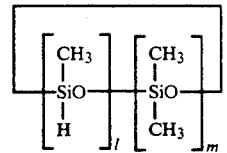

(B)

(wherein the sum of l and m is an integer of not less than 3, preferably 3–7).

These compounds represented by the formulas (A) and (B) can be used either singly or in the form of a mixture.

In the formulas (A) and (B), it is more preferably that n, and the sum of l and m are respectively integers of 3 to 7. With the decrease of the value of n (or l+m), the boiling point of the compound lowers, and the amount of the substance adsorbed on the particles increases. The more suitable value for n (or m+l) is an integer of 3 or 4, because polymerization is facilitated due to the steric properties thereof.

As the cyclic silicone compounds represented by the formula (II), dihydrogen hexamethyl cyclotetrasiloxane, trihydrogen pentamethylcyclotetrasiloxane, tetrahydrogen tetramethylcyclotetrasiloxane, dihydrogen octamethylcyclopentasiloxane, trihydrogen heptamethylcyclopentasiloxane, tetrahydrogen hexamethylcyclopentasiloxane and pentahydrogen pentamethylcyclopentasiloxane may be exemplified.

The formula (III) corresponds to the case in which c=2 in the formula (I) and represents a straight-chain silicone compound:

$$(R^1HSiO)_a(R^2R^3SiO)_b(R^4R^5R^6SiO_{\frac{1}{2}})_2 \qquad (III)$$

(wherein $R^1$, $R^2$, $R^3$, $R^4$, $R^5$ and $R^6$, a and b are respectively the same as defined above, and preferably $R^1$ to $R^6$ are respectively hydrocarbon group having 1 to 10 carbon atoms, more preferably 1–6 carbon atoms which may be substituted by at least one halogen atom). The typical example of the straight-chain silicone compound is represented by the following general formula (C):

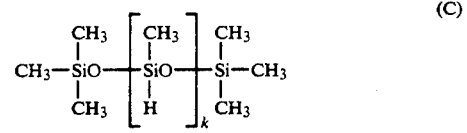

(C)

(wherein k represents an integer of 2 to 5).

As the straight-chain silicone compound represented by the general formula (II), 1,1,1,2,3,4,4,4-octamethyltetrasiloxane, 1,1,1,2,3,4,5,5,5-nonamethylpentasiloxane and 1,1,1,2,3,4,5,6,6,6-decamethylhexasiloxane may be exemplified.

In the present invention, the particles are contacted with a specified silicone compound monomer in a gas phase, for example, by means of supplying the vapor of the specified silicone compound monomer in a molecular state on the surfaces of the particles in a sealed container at a temperature of not higher than 120° C., preferably not higher than 100° C., and a pressure of not higher than 400 mmHg, preferably not higher than 200 mmHg, or supplying a mixed gas of the specified silicone compound monomer and a carrier gas such as $N_2$ gas on the surfaces of the particles at a temperature of not higher than 120° C., preferably not higher than 100° C.

The amount of silicone compound polymer used for coating is 0.1 to 10 wt %, preferably 0.2 to 8.0 wt % expressed as Si based on Fe in the particles treated. If it is less than 0.1 wt %, since the suppressing effect on the surface activity of the particles is insufficient, the thickness of the oxide layer becomes large, the oxide layer is apt to become coarse and non-uniform, which often leads to the deterioration of the magnetic characteristics, in particular, the reduction in the saturation magnetization and the deterioration of the S.F.D. If it exceeds 10 wt %, the component which has no relation with the magnetic characteristics increases, which often leads to the reduction of the saturation magnetization of the acicular magnetic metal particles containing iron as the main ingredient obtained.

In the present invention, the polymerization reaction between the specified silicone compound monomers arises on the surfaces of the particles by contacting the particles with the specified silicone compound monomer. It is generally impossible to form a uniform and dense film by thermal polymerization. It is impossible to coat only the surfaces of the particles uniformly by polymerization in the presence of a catalyst, because the polymerization proceeds primarily in the vicinity of the catalyst.

There are two kinds of structure for the polymer. A polymer of a silicone compound obtained by the polymerization caused by the cleavage or recombination of a siloxane bond (—Si—O—Si—) has only a chain structure of a (—Si—O—Si) unit. On the other hand, a polymer from a specified silicone compound monomer obtained by the polymerization caused by the crosslinking reaction of hydrosilyl bond (Si—H) in the presence of H$_2$O or O$_2$ has a reticulate structure having the following unit:

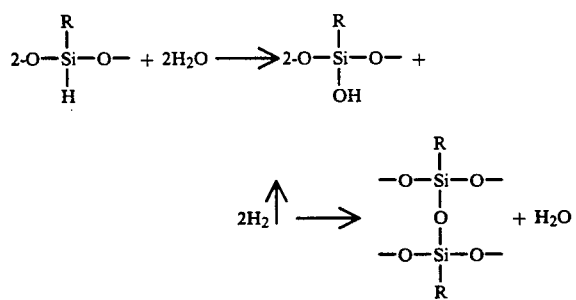

derived from the following unit:

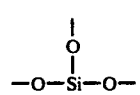

In this case, in the polymer of a silicone compound having a reticulate structure (hereinunder referred to as "a polymer having a reticulate structure"), it is preferable that Si atom of not less than 20%, more preferably not less than 25% based on the total Si atoms are converted into the following unit:

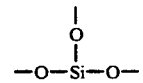

The content of this unit can be obtained by the IR absorption of the methyl group in the silicone compound formed.

When the content of this unit increases and the reticulate structure develops, the silicone compound is not depolymerized by heating and releases only methane, thereby forming an Si oxide. This state can be confirmed by pyrolysis gas chromatography.

The present invention allows the presence of another structure derived from a specified silicone compound monomer.

The acicular magnetic metal particles obtained in accordance with the present invention maintain the shapes of the starting material particles owing to the adequate prevention of sintering of the particles and between the particles, and have an excellent dispersibility because the particles are independently distributed, so that the acicular magnetic metal particles show an excellent orientation, saturation magnetic flux density and squareness (Br/Bm) orientation.

The acicular magnetic metal particles containing iron as the main ingredient according to the present invention are suitable as magnetic particles for high-density recording with a high output and a low noise level, which have now been in the strongest demand.

EXAMPLES

The present invention will be more precisely explained while referring to Examples as follows.

However, the present invention is not restricted to Examples under mentioned. From the foregoing description, one skilled in the art can easily ascertain the essential characteristics of the present invention, and without departing from the spirit and scope thereof, can make various changes and modifications of the invention to adapt it to various usages and conditions.

In the examples and comparative examples, the major axial diameter and the aspect ratio (major axial diameter/minor axial diameter) of the particles were expressed by the averages of the values measured from an electro micrograph.

The magnetic characteristics of the acicular magnetic metal particles containing iron as the main ingredient and magnetic tapes were expressed by the values measured under an external magnetic field of 10 KOe by a Vibrating-sample Magnetometer VSM.3S.15 produced by TOEI KOGYO CO., LTD.

The S.F.D. value was obtained by measuring the half-width of the obtained differentiation curve of the coercive force by using a sheet-like sample obtained in the following process and a differentiation circuit of the said magnetometer, and dividing the obtained half-width by the coercive force at the peak of the curve.

Production of Sheet-like Sample

A magnetic coating was prepared by mixing and dispersing the following materials (A) in a 140-cc glass bottle for 6 hours. The magnetic coating was applied to polyethylene terephthalate film to a thickness of 25 μm by an applicator, and the film was then dried in a magnetic field of 5 KGauss Material [A]:

| | |
|---|---|
| Kneaded material (obtained by kneading 100 parts of acicular magnetic metal particles containing iron as the main ingredient and 50 parts of vinyl chloride and epoxy copolymer having a sodium surfonate group in the form of a 30 wt % cyclohexanone solution by a 88-cc blast mill for 45 minutes) | 100 parts by weight |
| Glass beads 1 mm in diameter | 530 parts by weight |
| Cyclohexanone | 50 parts by weight |
| Methylethyl ketone | 57 parts by weight |
| Toluene | 57 parts by weight |

The crystallite size ($D_{110}$) was the size of the crystal grain measured by X-ray diffractometry expressed by a thickness of the crystalline particle in the direction perpendicular to the crystal plane (110). The measured value was calculated from the following equation in accordance with a crystallinity measuring method:

$$D_{110} = \frac{K\lambda}{\beta \cos\theta}$$

wherein
- $\beta$: the half-width of the real diffraction peak
- $\kappa$: Sheller constant (0.9)
- $\lambda$: the wavelength of X-ray (1.935 Å)
- $\theta$: diffraction angle As the evaluation on the dispersibility, the squareness of acicular magnetic metal particles, and the magnetic flux density Bm, the squareness and the degree of orientation of the magnetic tape were shown, indicating that the larger these values are, the more improved the dispersibility is.

The oxidation stability was expressed by the reduction ratio (%) of the saturation magnetization of the sample which had been allowed to stand at a temperature of 60° C. and a relative humidity of 90% for 7 days. The smaller the reduction ratio, the more improved the oxidation stability. The reduction ratio is preferably not more than 10.0%.

EXAMPLE 1

Spindle-shaped goethite particles having a major axial diameter of 0.22 μm and an aspect ratio (major axial diameter/minor axial diameter) of 12 with compounds containing Co, Al and B on the surfaces thereof were heat-treated at 350° C. in air, thereby obtaining acicular hematite particles having a major axial diameter of 0.22 μm and an aspect ratio (major axial diameter/minor axial diameter) of 12. 300 g of the thus-obtained acicular hematite particles were charged into a 3-l retort and reduced with H₂ gas at the rate of 35 l/min at a temperature of 390° C. while rotating.

The retort was then cooled to 60° C. by passing nitrogen gas therethrough. After passing nitrogen gas containing water vapour therethrough (4.2 g of water as a water content was supplied), nitrogen gas was bubbled in a separately prepared container of 50 g of tetramethylcyclotetrasiloxane (represented by the formula (A), wherein n=4) held at 60° C., and the resultant mixed gas was suppled to the retort for 2 hours.

Thereafter, the supply of the mixed gas was stopped and the particles were heated at 80° C. for 2 hours so as to remove the surplus silicone compound from the reaction system. Further, the temperature in the retort was raised to 120° C. and this state was kept for 2 hours so as to increase the density of the silicone compound produced.

The particles were then aerated with air at the rate of 0.2 l/min for 30 minutes while passing nitrogen gas therethrough. After the aeration, the acicular magnetic metal particles containing iron as the main ingredient were taken out to air. The amount of silicone compound polymer was 1.51 wt %, expressed as Si based on Fe on the elementary analysis.

As a result of analysis of the acicular magnetic metal particles containing iron as the main ingredient by infrared absorption spectrum, it was found that the absorption of the Si—CH₃ group at a wavelength of 1260 cm⁻¹ was shifted to 1270 cm⁻¹ and that oxygen had reacted with the Si—H group to produce Si—O. By pyrolysis gas-chromatography at 590° C., it was observed that only methane was produced. As a result, it was confirmed that tetramethylcyclotetrasiloxane had polymerized with crosslinking and a reticulate polymer was produced. It was recognized from this fact that the surfaces of the acicular magnetic metal particles containing iron as the main ingredient were coated with a polymer having a reticulate structure.

According to the observation through an electron microscope, the acicular magnetic metal particles containing iron as the main ingredient had a major axial diameter of 0.15 μm, and a crystallite size ($D_{110}$) of 160 Å. The coercive force was 1630 Oe, the saturation magnetization was 161.0 emu/g and the S.F.D. was 0.297.

EXAMPLES 2 TO 7, COMPARATIVE EXAMPLES 1 TO 3

The acicular magnetic metal particles containing iron as the main ingredient were produced in the same way as in Example 1 except for varying the kind of acicular ferric oxide hydroxide particles, the heat-treating temperature, the reducing temperature and time, the kind of silicon compound, the amount of Si/Fe and the treating condition as shown in Table 1.

Various properties of the thus-obtained acicular magnetic metal particles containing iron as the main ingredient are shown in Table 2.

The surfaces of the particles in Example 5 were coated with the polymer formed from the specified silicone compound monomer in the following manner. The acicular magnetic metal particles containing iron as the main ingredient after the reduction were charged into a container purged with nitrogen and were allowed to stand in a sealed temperature controlled bath together with 1.8 g of tetramethylcyclotetrasiloxane. The particles were then treated at 70° C. and 200 mmHg for 5 hours.

TABLE 1

| Example & Comparative Example | Kind of acicular ferric oxide hydroxide particles | Heat-treatment Temperature (°C.) | Acicular hematite particles | | Heat-treatment | |
|---|---|---|---|---|---|---|
| | | | Major axial diameter (μm) | Aspect ratio (major axial diameter/minor axial diameter) | Temp. (°C.) | Time (Hr) |
| Example 1 | Spindle-shaped goethite particles coated with | 350 | 0.22 | 12 | 390 | 8 |

TABLE 1-continued

|   | | | | | |
|---|---|---|---|---|---|
| | compounds containing Co, Al and B (major axial diameter: 0.22 μm and aspect ratio: 12), (Co/Fe = 6.5 atm %, Al/Fe = 3.1 atm % and B/Fe = 4.4 atm %) | | | | |
| Example 2 | Spindle-shaped goethite particles coated with compounds containing Co and Al (major axial diameter: 0.10 μm and aspect ratio: 6), (Co/Fe = 6.0 atm % and Al/Fe = 2.7 atm %) | 350 | 0.11 | 6 | 360  15 |
| Example 3 | Spindle-shaped goethite particles coated with compounds containing Al, Ni and B (major axial diameter: 0.16 μm and aspect ratio: 9), (Al/Fe = 2.6 atm %, Ni/Fe = 0.5 atm % and B/Fe = 2.5 atm %) | 400 | 0.16 | 9 | 380  10 |
| Example 4 | Spindle-shaped goethite particles coated with compounds containing Co (major axial diameter: 0.29 μm and aspect ratio: 15), (Co/Fe = 5.0 atm %) | 400 | 0.29 | 15 | 410  7 |
| Example 5 | Spindle-shaped goethite particles coated with compounds containing Si and Ni (major axial diameter: 0.20 μm and aspect ratio: 9), (Si/Fe = 2.2 atm % and Ni/Fe = 4.0 atm %) | 550 | 0.19 | 8.5 | 430  6 |
| Example 6 | Spindle-shaped geothite particles coated with compounds containing Al and B (major axial diameter: 0.24 μm and aspect ratio: 15), (Al/Fe = 1.6 atm % and B/Fe = 5.0 atm %) | 350 | 0.24 | 15 | 410  7 |
| Example 7 | Same spindle-shaped goethite as those in Example 1. | 400 | 0.22 | 12 | 400  7 |
| Comparative Example 1 | Same spindle-shaped goethite as those in Example 1. | 350 | 0.22 | 12 | 390  8 |
| Comparative Example 2 | Same spindle-shaped goethite as those in Example 1. | 350 | 0.22 | 12 | 390  8 |
| Comparative Example 3 | Same spindle-shapd goethite as those in Example 1. | 350 | 0.22 | 12 | 390  8 |

| Example & Comparative Example | Treatment with silicone compound | | Heat-treatment | | Initial oxidation treatment | | |
|---|---|---|---|---|---|---|---|
| | Kind of silicone compound | Treating condition | Temp. (°C.) | Time (Hr) | Amount of air (l/min)/(l/min · kg) | Time (min.) | Temp. (°C.) |
| Example 1 | tetramethylcyclotetrasiloxane | N₂ carrier (60° C.) | 120 | 2 | 0.2/0.95 | 30 | room temperature |
| Example 2 | tetramethylcyclotetrasiloxane | N₂ carrier (40° C.) | 120 | 2 | 0.2/0.95 | 30 | room temperature |
| Example 3 | tetramethylcyclotetrasiloxane | N₂ carrier (60° C.) | 120 | 2 | 0.2/0.95 | 30 | room temperature |
| Example 4 | decamethylhexasiloxane | N₂ carrier (60° C.) | 120 | 2 | 0.2/0.95 | 30 | room temperature |
| Example 5 | tetramethylcyclotetrasiloxane | under a reduced pressure of 200 mmHg (70° C.) | 120 | 2 | 0.2/0.95 | 30 | room temperature |
| Example 6 | tetramethylcyclotetrasiloxane | N₂ carrier (60° C.) | 110 | 2 | 0.11/0.5 | 30 | 60 |
| Example 7 | tetramethylcyclotetrasiloxane | N₂ carrier (50° C.) | 100 | 4 | 0.30/1.4 | 30 | 50 |
| Comparative Example 1 | tetramethylcyclotetrasiloxane | N₂ carrier (60° C.) | 120 | 2 | 0.2/0.95 | 30 | room temperature |
| Comparative Example 2 | tetramethylcyclotetrasiloxane | N₂ carrier (60° C.) | 120 | 2 | 0.2/0.95 | 30 | room temperature |
| Comparative Example 3 | methyltriethoxysiloxane | N₂ carrier (60° C.) | 120 | 2 | 0.2/0.95 | 30 | room temperature |

TABLE 2

| Examples & Comparative Examples | Acicular magnetic metal particles containing iron as the main ingredient | | | | | | |
|---|---|---|---|---|---|---|---|
| | Amount of Si/Fe (wt %) | Major axial diameter (μm) | Crystallite size ($D_{110}$) (Å) | Coercive force Hc (Oe) | Saturation magnetization σs (emu/g) | Squareness | S.F.D. |
| Example 1 | 1.51 | 0.15 | 160 | 1630 | 161.0 | 0.518 | 0.297 |
| Example 2 | 5.70 | 0.08 | 145 | 1670 | 157.6 | 0.508 | 0.345 |
| Example 3 | 0.90 | 0.11 | 155 | 1610 | 156.6 | 0.519 | 0.328 |
| Example 4 | 2.00 | 0.19 | 175 | 1520 | 165.8 | 0.500 | 0.289 |
| Example 5 | 0.38 | 0.13 | 170 | 1570 | 158.0 | 0.510 | 0.338 |
| Example 6 | 2.5 | 0.16 | 170 | 1650 | 158.6 | 0.520 | 0.300 |
| Example 7 | 1.1 | 0.15 | 165 | 1635 | 162.5 | 0.520 | 0.300 |
| Comparative Example 1 | 13.4 | 0.15 | 162 | 1625 | 140.9 | 0.520 | 0.300 |
| Comparative Example 2 | 0.09 | 0.15 | 150 | 1590 | 134.4 | 0.500 | 0.415 |
| Comparative Example 3 | 1.53 | 0.15 | 157 | 1610 | 151.3 | 0.505 | 0.390 |

As is clear from Table 2, the acicular magnetic metal particles containing iron as the main ingredient of the present invention were fine particles and excellent in any of the coercive force, the saturation magnetization and the S.F.D.

EXAMPLE 8

1 kg of spindle-shaped goethite particles having a major axial diameter of 0.18 μm and an aspect ratio (major axial diameter/minor axial diameter) of 10 and coated with a hydroxide of Al (2.1 atm % expressed as Al based on Fe) and a boron compound (4.1 atm % expressed as B based on Fe) were heat-treated at 500° C. in air to obtain acicular hematite particles having a major axial diameter of 0.18 μm and an aspect ratio (major axial diameter/minor axial diameter) of 10.0. 300 g of the thus-obtained acicular hematite particles were charged into a 3-l reducing retort, reduced with $H_2$ gas at the rate of 35 l/min at a temperature of 400° C. for 12 hours while rotating. The retort was then cooled to room temperature by passing nitrogen gas therethrough.

210 g of the particles obtained were charged into 5-rotary double cone reaction vessel (made of stainless steel and equipped with an insulated jacket). After passing nitrogen gas containing water vapour therethrough (4.2 g of water as a water content was supplied), 50 g of tetramethylcyclotetrasiloxane was charged into a stock solution supply tank which was directly connected to the reaction vessel by a stainless steel pipe and was supplied to the reaction vessel while nitrogen was bubbled from the underside of the stock solution supply tank. The temperature of the system was maintained at 40° C. by supplying a heat medium from a heating tank to the reaction vessel and the insulated jacket of the stock supply tank by a circulating pump. The reaction vessel was given three revolutions after allowing the particles to stand for 10 minutes while being controlled by a timer. This rotating operation was repeated for 7 hours. Thereafter, the silicone compound was removed from the stock solution supply tank and the temperature of the entire system was raised to 80° C. The rotation was continued another 2 hours so as to remove the silicone compound from the reaction vessel.

After cooling to the room temperature, the particles were then aerated with air at the rate of 0.5 l/min for 90 minutes while passing nitrogen gas therethrough. After the aeration, the acicular magnetic metal particles containing iron as the main ingredient were taken out to air. According to the observation through an electron microscope, the acicular magnetic metal particles containing iron as the main ingredient obtained had a major axial diameter of 0.13 μm, and an aspect ratio (major axial diameter/minor axial diameter) of 8.0. The particles were separate from each other and the shapes of the starting material particles were maintained. As to the magnetic characteristics, the coercive force was 1650 Oe, the saturation magnetization was 130.9 emu/g, the squareness was 0.515, S.F.D. was 0.355 and the oxidation stability was 7.9%.

As a result of analysis of the thus-obtained acicular magnetic metal particles containing iron as the main ingredient by infrared absorption spectrum, it was found that the absorption of the $Si-CH_3$ group at a wavelength of 1260 $cm^{-1}$ was shifted to 1270 $cm^{-1}$. By pyrolysis gas chromatography at 590° C., it was observed that only methane was produced, so that it was confirmed that tetramethylcyclotetrasiloxane had polymerized with crosslinking and a reticulate polysiloxane was produced. On the elementary analysis of the polymer, the amount was 1.5 wt % in terms of Si based on Fe.

EXAMPLES 9 TO 10, COMPARATIVE EXAMPLES 4 TO 6

The acicular magnetic metal particles containing iron as the main ingredient were produced in the same way as in Example 8 except for varying the kind of acicular ferric oxide hydroxide particles, the heat-treating temperature, the reducing temperature and time, the kind of silicon compound, the amount of Si/Fe and the treating condition as shown in Table 3.

Various properties of the thus-obtained acicular magnetic metal particles containing iron as the main ingredient are shown in Table 4.

TABLE 3

| Example & Comparative Example | Kind of acicular ferric oxide hydroxide particles | Heat-treatment Temperature (°C.) | Acicular hematite particles Major axial diameter (μm) | Aspect ratio (major axial diameter/minor axial diameter) | Heat-treatment Temperature (°C.) | Time (Hr) |
|---|---|---|---|---|---|---|
| Example 8 | Spindle-shaped goethite particles coated with hydroxide of Al and boron compound (major axial diameter: 0.18 μm and aspect ratio: 10), (Al/Fe = 2.1 atm % and B/F = 4.1 atm %) | 500 | 0.18 | 10.0 | 400 | 12 |
| Example 9 | Same spindle-shaped goethite particles as those in Example 1. | 400 | 0.22 | 12.0 | 410 | 7 |
| Example 10 | Same spindle-shaped goethite particles as those in Example 3. | 450 | 0.16 | 9.0 | 390 | 9 |
| Comparative Example 4 | Same spindle-shaped goethite particles as those in Example 8. | 500 | 0.18 | 10.0 | 400 | 12 |
| Comparative Example 5 | Same spindle-shaped goethite particles as those in Example 1. | 400 | 0.22 | 12.0 | 410 | 7 |
| Comparative Example 6 | Same spindle-shaped goethite particles as those in Example 1. | 400 | 0.22 | 12.0 | 410 | 7 |

| Example & Comparative Example | Treatment with silicone compound Kind of silicone compound | Treating condition | Initial oxidation treatment Amount of air (l/min)/ (l/min · kg) | Time (min.) | Temperature (°C.) |
|---|---|---|---|---|---|
| Example 8 | tetramethylcyclotetrasiloxane | $N_2$ carrier (40° C.) | 0.50/2.38 | 90 | room temperature |
| Example 9 | tetramethylcyclotetrasiloxane | $N_2$ carrier (40° C.) | 0.45/2.1 | 60 | 30 |

TABLE 3-continued

| | | | | | |
|---|---|---|---|---|---|
| Example 10 | pentamethylcyclotetra-siloxane | $N_2$ carrier (70° C.) | 0.75/3.6 | 60 | 100 |
| Comparative Example 4 | — | — | 0.50/2.38 | 90 | room temperature |
| Comparative Example 5 | methyltriethoxysilane | $N_2$ carrier (40° C.) | 0.45/2.1 | 60 | 30 |
| Comparative Example 6 | tetraethoxysilane | $N_2$ carrier (40° C.) | 0.45/2.1 | 60 | 30 |

TABLE 4

| Example & Comparative Example | Acicular magnetic metal particles containing iron as the main ingredient | | | | | | | | |
|---|---|---|---|---|---|---|---|---|---|
| | Amount of Si/Fe (wt %) | Major axial diameter (μm) | Aspect ratio (major axial diameter/minor axial diameter) | Crystallite size ($D_{110}$) (Å) | Coercive force Hc (Oe) | Saturation magnetization σs (emu/g) | Squareness | S.F.D. | Oxidation stability (%) |
| Example 8 | 1.5 | 0.13 | 8.0 | 155 | 1650 | 130.9 | 0.515 | 0.355 | 7.9 |
| Example 9 | 2.1 | 0.15 | 8.0 | 160 | 1625 | 140.8 | 0.515 | 0.315 | 9.0 |
| Example 10 | 0.6 | 0.11 | 6.5 | 145 | 1570 | 115.0 | 0.500 | 0.370 | 0.9 |
| Comparative Example 4 | — | 0.13 | 8.0 | 150 | 1610 | 126.9 | 0.505 | 0.430 | 17.5 |
| Comparative Example 5 | 2.1 | 0.15 | 8.0 | 155 | 1605 | 134.0 | 0.505 | 0.400 | 11.5 |
| Compartive Example 6 | 2.1 | 0.15 | 8.0 | 155 | 1600 | 132.1 | 0.500 | 0.395 | 11.3 |

COMPARATIVE EXAMPLE 7

To a retort containing the reduced acicular magnetic metal particles containing iron as the main ingredient produced in the same way as in Example 3, nitrogen gas passed through a separately prepared methyltriethoxysilane held at 60° C. was supplied at the rate of 40 l/min for 10 minutes and thereafter nitrogen gas passed through water held at 50° C. was supplied thereto at the rate of 40 l/min for 3 minutes. Such introducing treatment of each of methyltriethoxysilane and water was carried out in the same manner ten times, alternately. After cooling to the room temperature, the obtained acicular magnetic metal particles containing iron as the main ingredient were taken out to air.

The amount of silicone compound polymer was 2.40 wt %, expressed as Si based on Fe on the elementary analysis.

According to the observation through an electron microscope, the acicular magnetic metal particles containing iron as the main ingredient has a major axial diameter of 0.11 μm, and a crystallite size ($D_{110}$) of 150 Å. The coercive force was 1605 Oe, the saturation magnetization was 146.3 emu/g the squareness ratio was 0.508, the S.F.D. was 0.423 and the oxidation stability was 16.2%.

The saturation magnetic flux density (Bm), the squareness (Br/Bm) and the degree of orientation are shown in Table 5.

COMPARATIVE EXAMPLE 8

The acicular magnetic metal particles containing iron as the main ingredient were produced in the same way as comparative Example 7 except for using tetraethoxysilane instead of methyltriethoxysilane.

The amount of silicone compound polymer was 2.40 wt %, expressed as Si based on Fe on the elementary analysis.

According to the observation through an electron microscope, the acicular magnetic metal particles containing iron as the main ingredient had a major axial diameter of 0.11 μm, and a crystallite size ($D_{110}$) of 150 Å. The coercive force was 1600 Oe, the saturation magnetization was 144.01 emu/g the squareness ratio was 0.505, the S.F.D. was 0.424 and the oxidation stability was 15.5%.

The saturation magnetic flux density (Bm), the squareness (Br/Bm) and the degree of orientation are shown in Table 5.

REFERENCE EXAMPLE

Production of Magnetic Tape

A magnetic tape was produced in accordance with the method of the production of sheet-like sample described above using the acicular magnetic metal particles containing iron as the main ingredient obtained in Examples and Comparative Examples.

The saturation magnetic flux density (Bm), the squareness (Br/Bm) and the degree of orientation are shown in Table 5.

TABLE 5

| Reference Examples | Kind of acicular magnetic metal particles containing iron as the main ingredient (Examples & Comparative Examples No.) | Tape characteristics | | |
|---|---|---|---|---|
| | | Saturation magnetic flux density (Bm) (Gauss) | Squareness (Br/Bm) | Orientation |
| 1 | Example 1 | 4800 | 0.912 | 4.01 |
| 2 | Example 2 | 4400 | 0.855 | 3.80 |
| 3 | Example 3 | 4500 | 0.902 | 3.93 |
| 4 | Example 4 | 4900 | 0.914 | 4.05 |
| 5 | Example 5 | 4600 | 0.899 | 3.90 |
| 6 | Example 6 | 4700 | 0.908 | 3.95 |
| 7 | Example 7 | 4800 | 0.908 | 4.00 |
| 8 | Example 8 | 4100 | 0.895 | 3.90 |
| 9 | Example 9 | 4300 | 0.905 | 4.00 |
| 10 | Example 10 | 3500 | 0.895 | 3.90 |
| 11 | Comparative Example 1 | 4300 | 0.901 | 3.90 |
| 12 | Comparative Example 2 | 3700 | 0.870 | 3.60 |
| 13 | Comparative Example 3 | 4200 | 0.880 | 3.70 |
| 14 | Comparative Example 4 | 3500 | 0.860 | 3.50 |
| 15 | Comparative Example 5 | 3800 | 0.870 | 3.65 |
| 16 | Comparative Example 6 | 3800 | 0.875 | 3.70 |
| 17 | Comparative Example 7 | 4000 | 0.870 | 3.65 |
| 18 | Comparative Example 8 | 4000 | 0.870 | 3.65 |

What is claimed is:

1. Acicular magnetic metal particles containing iron as the main ingredient the surfaces of which are coated with a polymer formed from at least one of silicone compounds represented by the following formula (I):

$$(R^1HSiO)_a(R^2R^3SiO)_b(R^4R^5R^6SiO_{\frac{1}{2}})_c \qquad (I)$$

wherein $R^1$, $R^2$, $R^3$, $R^4$, $R^5$ and $R^6$ respectively represent a hydrogen atom or hydrocarbon group having 1 to 10 carbon atoms which hydrocarbon group may be substituted by at least one halogen atom, a and b are respectively 0 or integers of not less than 1, and c is 0 or 2, provided that when c is 0, the sum of a and b is an integer of not less than 3 and which have a coercive force of not less than 1400 Oe, a saturation magnetization of not less than 100 emu/g, a major axial diameter of not more than 0.25 μm and an S.F.D. of not more than 0.38.

2. Acicular magnetic metal particles according to claim 1, which further have an oxidation stability of not more than 10%.

3. Acicular magnetic metal particles according to claim 1, wherein the amount of the polymer formed from said silicone compounds for coating is 0.1 to 10 wt % expressed as Si based on Fe.

4. Acicular magnetic metal particles according to claim 1, wherein said silicone compounds represented by the formula (I) is a compound represented by the following formula (II):

$$(R^1HSiO)_a(R^2R^3SiO)_b \qquad (II)$$

wherein $R^1$, $R^2$, $R^3$, a and b are respectively the same as defined above.

5. Acicular magnetic metal particles according to claim 1, wherein said silicone compounds represented by the formula (I) is a compound represented by the following formula (III):

$$(R^1HSiO)_a(R^2R^3SiO)_b(R^4R^5R^6SiO_{\frac{1}{2}})_2 \qquad (III)$$

wherein $R^1$, $R^2$, $R^3$, $R^4$, $R^5$ and $R^6$, a and b are as defined in claim 1.

6. Acicular magnetic metal particles containing iron as the main ingredient the surfaces of which are coated with a polymer formed from at least one of silicone compounds represented by the following formula (I):

$$(R^1HSiO)_a(R^2R^3SiO)_b(R^4R^5R^6SiO_{\frac{1}{2}})_c \qquad (I)$$

wherein $R^1$, $R^2$, $R^3$, $R^4$, $R^5$ and $R^6$ respectively represent a hydrogen atom or hydrocarbon groups having 1 to 10 carbon atoms which hydrocarbon group may be substituted by at least one halogen atom, a and b are respectively 0 or integers of not less than 1, and c is 0 or 2, provided that when c is 0, the sum of a and b is an integer of not less than 3 and which have a coercive force of not less than 1500 Oe, a saturation magnetization of not less than 155 emu/g, a major axial diameter of not more than 0.2 μm and an S.F.D. of not more than 0.35.

7. Acicular magnetic metal particles according to claim 6, wherein the amount of the polymer formed from said silicone compounds for coating is 0.1 to 10 wt % expressed as Si based on Fe.

8. Acicular magnetic metal particles according to claim 6, wherein said silicone compounds represented by the formula (I) is a compound represented by the following formula (II):

$$(R^1HSiO)_a(R^2R^3SiO)_b \qquad (III)$$

wherein $R^1$, $R^2$, $R^3$, a and b are as defined in claim 6.

9. Acicular magnetic metal particles according to claim 6, wherein said silicone compounds represented by the formula (I) is a compound represented by the following formula (III):

$$(R^1HSiO)_a(R^2R^3SiO)_b(R^4R^5R^6SiO_{\frac{1}{2}})_2 \qquad (III)$$

wherein $R^1$, $R^2$, $R^3$, $R^4$, $R^5$ and $R^6$, a and b are as defined in claim 6.

* * * * *